United States Patent
Dalmia

(10) Patent No.: US 11,038,607 B2
(45) Date of Patent: Jun. 15, 2021

(54) METHOD AND SYSTEM FOR BI-DIRECTIONAL COMMUNICATION

(71) Applicant: SYNAPTICS INCORPORATED, San Jose, CA (US)

(72) Inventor: Kamal Dalmia, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 59 days.

(21) Appl. No.: 16/447,714

(22) Filed: Jun. 20, 2019

(65) Prior Publication Data
US 2020/0083974 A1 Mar. 12, 2020

Related U.S. Application Data

(60) Provisional application No. 62/729,733, filed on Sep. 11, 2018.

(51) Int. Cl.
*H04J 3/06* (2006.01)

(52) U.S. Cl.
CPC .................. *H04J 3/0658* (2013.01)

(58) Field of Classification Search
CPC ...... Y02D 30/50; Y02D 30/00; H04L 1/0041; H04L 1/0045; H04L 5/16; H04L 69/323; H04W 74/04; G06F 1/32; G06F 1/3234; H04J 3/0658; H04J 3/0638
See application file for complete search history.

(56) References Cited

U.S. PATENT DOCUMENTS

| 5,781,028 | A | 7/1998 | Decuir | |
|---|---|---|---|---|
| 2007/0266109 | A1 | 11/2007 | Mellott et al. | |
| 2009/0225779 | A1* | 9/2009 | Diab | H04J 3/0641 370/469 |
| 2010/0046543 | A1* | 2/2010 | Parnaby | H04L 12/12 370/465 |
| 2010/0115316 | A1* | 5/2010 | Diab | H04L 12/12 713/323 |
| 2012/0020266 | A1* | 1/2012 | Sun | H04W 52/0216 370/311 |

FOREIGN PATENT DOCUMENTS

| WO | 2002/054748 A1 | 7/2002 |
|---|---|---|
| WO | 2014/053565 A2 | 4/2014 |

OTHER PUBLICATIONS

Souvignier et al, Asymmetrical Data Transmission, IEEE 802.3Ch Task Force, Broadcom (2018) pp. 1-14, San Diego, CA.
Dalmia, Asymmetrical Link Operation using EEE, Aquantia Accelerating Connectivity, (2017) pp. 1-6.
(Continued)

*Primary Examiner* — Elton Williams
(74) *Attorney, Agent, or Firm* — Paradice & Li LLP

(57) ABSTRACT

A method and system for bi-directional communications are disclosed. According to one embodiment, a method comprises configuring the first device to enter an active mode according to a non-overlapping (NOL) schedule, the second device being in a silent mode. A transmitter of the first device transmits a first local data signal for a duration not exceeding a maximum tolerable silent duration of the second device. The first device is configured to enter the silent mode after transmitting the first local data signal, according to the NOL schedule.

23 Claims, 7 Drawing Sheets

(56) References Cited

OTHER PUBLICATIONS

Den Besten, Line Modulation Considerations for 2.5Gbps and 5/10Gbps Automotive Ethernet, 3ch1, NXP Semiconductors (2018) pp. 1-24, San Diego, CA.
International Search Report and Written Opinion dated Dec. 24, 2019, issued in International Appl. No. PCT/US2019/050524, filed Sep. 11, 2019, 12 pages.
Pheanis, David C., et al., "Vehicle-Bus Interface with GMLAN for Data Collection", Proceedings of the ISCA 18th International Conference on Computers and Their Applications, Honolulu, HI, Mar. 28, 2003, pp. 88-92.

* cited by examiner

METHOD AND SYSTEM FOR BI-DIRECTIONAL COMMUNICATION

CROSS-REFERENCE TO RELATED APPLICATIONS

This application claims priority to and the benefit of U.S. Provisional Patent Application No. 62/729,733, entitled "Method and System for Bi-directional Ethernet Communication using Fast Handover," and filed on Sep. 11, 2018, the entire contents of which are incorporated herein by reference.

FIELD

This disclosure generally relates to communication systems and, in particular, to techniques for efficient, bi-directional communication between a pair of devices.

BACKGROUND

In many applications, data needs to be exchanged between a pair of devices, such as a video source and a display, in both directions, e.g., from a first device in the pair to a second device in the pair and also from the second device to the first device. Often, some of the data transfers take place at high speeds and the others take place at relatively low speeds. For example, in video applications, video data needs to be transferred from a video source (e.g., a camera) to a video sink (e.g., a display) at high speeds. Certain control data may be transferred at relatively low speeds, however, between the video source and the video sink, in both directions. Control data from the video source to the video sink may specify, for example, how the video data is to be displayed, and control data from the video sink to the video source may specify, for example, the view angle, exposure, focus of the camera, etc., or the status of video sink device.

In many applications, a physical cable is used to exchange data between a pair of devices, regardless of the required data speed. In some applications, such as in automotive and aircraft systems, it is generally desirable to minimize the physical space required by the cables and/or the weight of the cables used for transferring the data, due to the generally stringent space and weight requirements of automobile and airplane design. Also, in automobiles and aircraft video systems coexist with other sensitive systems such as flight control and navigation systems, sensor systems, etc., where the communication cables, such as those carrying video and control signals, are subject to stringent electromagnetic interference (EMI) constraints.

One common type of communications system that use cables is Ethernet-based communication, which divides a stream of data into shorter pieces called frames. Each frame includes source and destination addresses and error-checking data so that damaged frames can be detected and discarded. Ethernet is a set of standardized hierarchical protocols and, typically, higher layer protocols trigger retransmission of lost frames. The Ethernet protocol specifies two modes of communication. In the half duplex mode that uses carrier sense multiple access/collision detect (CSMA/CD) technology, two or more devices may transmit at random times. If two or more devices happen to transmit at the same time, a collision occurs and is detected, and the devices then retransmit at other random times, in the hope that collision would be avoided in these later transmissions.

In the full duplex mode, the communication occurs between a pair of devices, where both devices may transmit and receive at the same time. Due to the simultaneous transmission and reception of data, e.g., simultaneous bi-directional communication, if a single wire/pair of wires is used for communication, echo-cancellation circuitry is needed. This can increase the cost and/or complexity of the communication system. Alternatively, two single wires or two pairs of wires must be used, where one wire/wire pair is used for communication in one direction (also called a forward channel) and another wire/wire pair is used for communication in the other direction (also called a reverse channel). This can increase the cost and/or weight of the communication cables, and/or the space required by the cables, which is undesirable in some applications, such as automotive and aircraft applications, as described above.

Energy-Efficient Ethernet (EEE) is a set of enhancements to the Ethernet family of computer networking standards that reduces power consumption during periods of low or no data activity. One of the goals of these enhancements is to reduce power consumption while retaining full compatibility with existing equipment. Energy-Efficient Ethernet is an Asymmetric protocol that enables network ports to switch between a high power state (also called the data mode) and a lower power state (also called the low power idle (LPI) mode) in response to whether data must flow between a pair of ports/devices. The high power and low power states are also referred to as Active and Idle states, respectively.

Per the EEE protocol, each physical layer (PHY) component (e.g., a network switch port, a network interface card (NIC), etc.) advertises its EEE capability during auto-negotiation when a link is established between two PHYs/devices. EEE compliant physical-layer devices use a modified static logic in order to transcend to the Low Power Idle (LPI) mode when no data would flow through them. In EEE compliant devices, the LPI signaling protocol is used to convey that a particular link needs to go to an idle state when there is no data transfer occurring via that link during a certain period. The LPI signaling generally produces an interruption or a gap in the data stream. When the data flow is to be re-initiated through the link, LPI signaling enables the link to resume to its normal operation in the data mode.

When no data flow occurs or is not expected to occur, the link is configured to be in the sleep mode so that the power consumption by the device ports that are connected to the two sides of the link is minimized. Even in the sleep mode, however, the transmitter of a PHY device generally sends periodic refresh signals (as shown in FIG. 1), for example, to ensure that the link is functioning and that the higher level systems, such as the network management system (NMS) are aware of the availability of the link, and known that the link can be re-awakened, as needed, at any time. This is especially important in the case of unpredictable/latency sensitive traffic.

With reference to FIG. 1, according to an example timing diagram of a pair of devices using the EEE protocol, the forward link/channel between the two devices always remains in the active mode (102). The forward link/channel supports communication in one direction, e.g., from a first device in the pair to the second device in the pair. The reverse link/channel, which supports communication in the other direction, e.g., from the second device to the first device, switches between the active mode (104) and the quiet mode (106). Prior to entering the quiet mode, the PHY transmitter of the second device sends a handover signal (108). The duration of the handover signal is denoted Ts.

While in the quiet mode, the reverse link/channel transitions, usually periodically, to a refresh state (110), where a "refresh" signal is transmitted by the PHY transmitter of the second device to the first device. The duration of the refresh signal is denoted Tr. After entering the quiet mode, the first transition to the refresh state (110) occurs after a delay denoted Tq. After sending the refresh signal, the reverse link/channel returns to the quiet mode. One or more additional transitions to the refresh state, and corresponding transmission(s) of the refresh signal can occur. When data is to be transmitted on the reverse link/channel, a "sync" signal (112) is transmitted from the transmitter of the second PHY device to the first device, and then the reverse link/channel enters the active mode (104).

Like the devices using the basic Ethernet protocols, EEE compliant devices operating over a single wire or a single pair of wires employ echo cancellation circuitry to allow bi-directional communications. Echo cancellation generally requires complex and costly signal processing circuitry which also often results in high power consumption. As in the case of the basic Ethernet-based systems, the need for echo cancellation can increase the cost and/or complexity of the communication system. Alternatively, EEE based systems can use two single wires or two pairs of wires, where one wire/wire pair is used for communication in one direction and another wire/wire pair is used for communication in the other direction. Here again, the use of two wires or two wire pairs can increase the cost and/or weight of the communication cables, and/or the space required by the cables, which is undesirable in some applications, such as automotive and aircraft applications, as described above.

SUMMARY

A method and system for bi-directional communication are disclosed. According to one embodiment, a method comprises configuring the first device to enter an active mode according to a non-overlapping (NOL) schedule, the second device being in a silent mode. A transmitter of the first device transmits a first local data signal for a duration not exceeding a maximum tolerable silent duration of the second device. The first device is configured to enter the silent mode after transmitting the first local data signal, according to the NOL schedule.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

Figure 1:
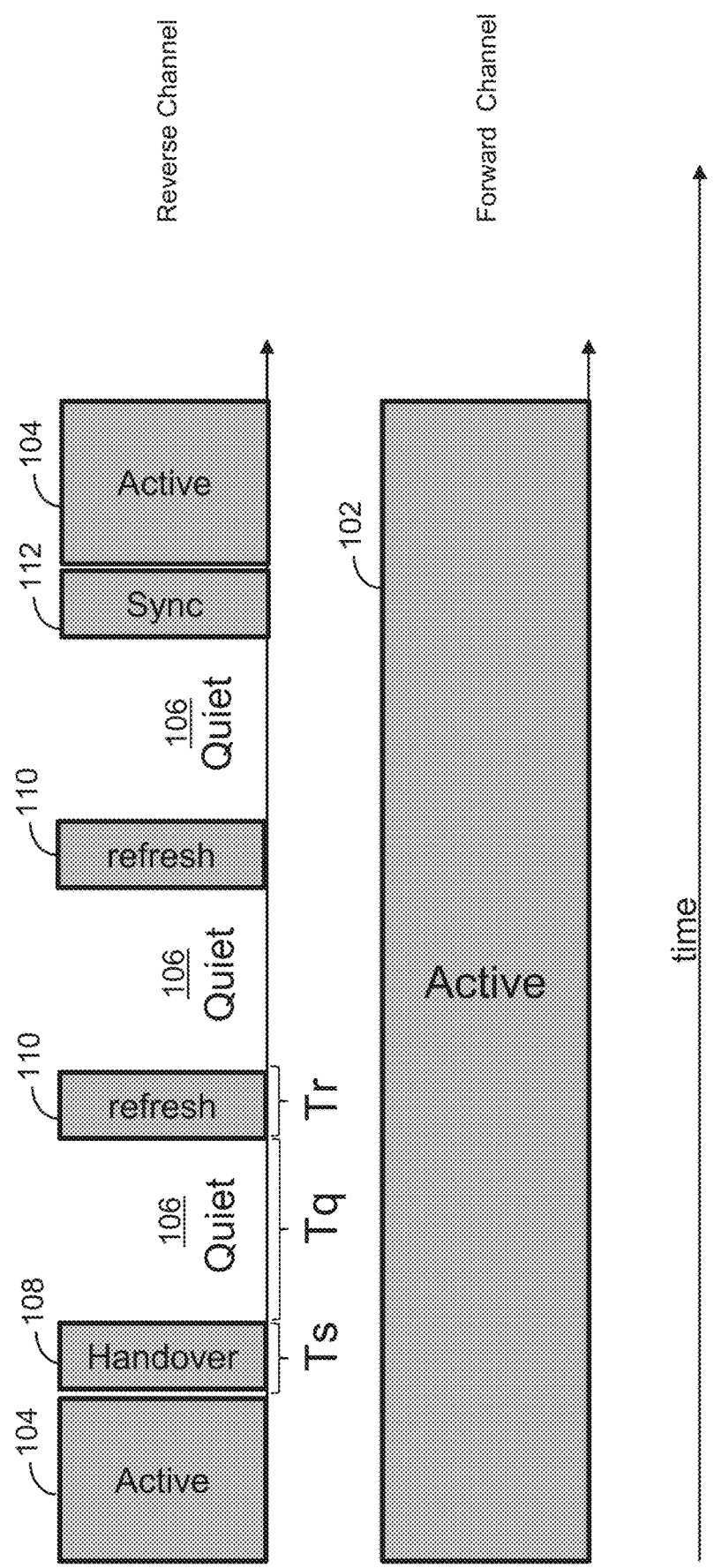
FIG. 1 is a timing diagram of a conventional energy-efficient Ethernet (EEE) based communication.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A method and system for bi-directional Communications are disclosed. According to one embodiment, a method comprises configuring the first device to enter an active mode according to a non-overlapping (NOL) schedule, the second device being in a silent mode. A transmitter of the first device transmits a first local data signal for a duration not exceeding a maximum tolerable silent duration of the second device. The first device is configured to enter the silent mode after transmitting the first local data signal, according to the NOL schedule.

The following disclosure provides different embodiments, or examples, for implementing different features of the subject matter. Specific examples of components and arrangements are described below to simplify the present disclosure. These are, of course, merely examples and are not intended to be limiting.

In Ethernet-based communication systems, the physical layer (PHY) devices in a connected pair must synchronize their respective clocks so that a receiving device can properly receive the data transmitted by a transmitting device. If the devices are always active, the synchronization can be performed at the beginning of a communication session, where the transmitting device transmits a training signal which the receiving device uses to determine a difference in phase and/or frequency between its own local clock and the clock of the transmitting device. Using this difference, the receiving device adjusts and synchronizes its clock with that of the transmitting device. Thereafter, the synchronization can be maintained until the end of the session.

The synchronization at a receiving device may be lost, however, if the transmitting device enters the silent mode for a certain duration, and stops transmission. Therefore, when the transmitting device re-enters the active mode, the receiving device must resynchronize its local clock. To this end, the transmitting device must retransmit the training signal, each time the transmitting device transitions from the silent mode to the active mode. The training signal does not carry any data, and is a communication overhead. The more often the transmitting device would switch between the silent and active modes, the larger the overhead.

In various embodiments described herein, both devices in a connected pair do switch between the silent and active modes according to a non-overlapping (NOL) schedule described below. Each device can transmit data when it is in the active mode and receive data when it is in the silent mode. As such, each device may function as a receiving device in the silent mode and must resynchronize its local clock with that of the other, transmitting device. This can add a substantial overhead to the communication system. A "lock assist" technique described herein with reference to FIG. 2 can minimize this overhead.

Figure 2:
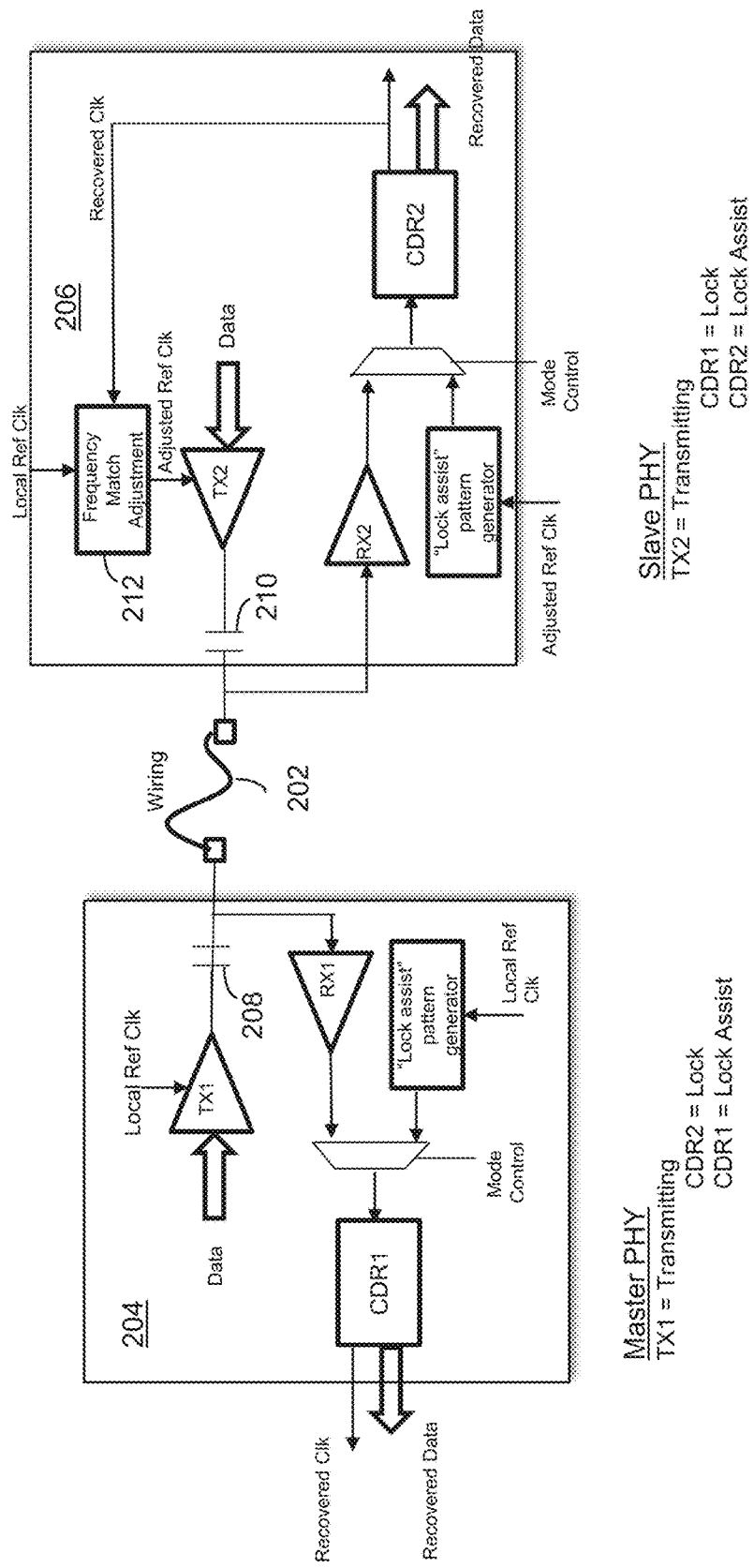
FIG. 2 schematically depicts the operation of a pair of physical layer (PHY) devices in performing clock synchronization, according to one embodiment.

In the communication system 200 shown in FIG. 2, a communication link 202 is established between two bi-directional PHY devices 204, 206, according to one embodiment. The link 202 is bi-directional, and may use a single physical medium channel (e.g., a single wire or a single pair of wires) that can carry both data and control signals. For example, the link 202 may carry high speed (e.g., megabit-per-second, gigabit-per-second, etc.) forward channel data and control signals (e.g., from a source of data to a consumer of the data), and relatively low speed (e.g., kilobits-per-second, megabits-per-second, etc.) reverse channel control signals (e.g., from the consumer to the source). In some embodiments, the link 202 may carry data in both directions.

The two link partner PHY devices 204, 206 are assigned master and slave roles during an auto-negotiation process that is typically performed in Ethernet systems. In the system 200, the PHY device 204 is the master device and the PHY device 206 is the slave device. According to a non-overlap (NOL) schedule (discussed below) the transmitter TX1 of the master 204 transmits data first, when the master 204 is in the active mode and the slave 206 is in the silent mode. After the master ceases transmission and enters the silent mode, the slave 206 enters the active mode and the transmitter TX2 of the slave 206 then transmits data. In embodiments in which the PHY devices do not use a master/slave designation, an order of transmission may be selected via arbitration during auto-negotiation. Due to the NOL schedule of transmissions, no signal collision occurs on the link 202 after completing auto-negotiation.

Specifically, when the master 204 is in the active mode and the slave 206 is in the silent mode, the transmitter TX2 of the slave 206 may transmit an all high or all-low signal, which is blocked by the DC-blocking capacitors 208, 210, so that the receiver RX2 of the slave 206 can receive the signals transmitted by the transmitter TX1 of the master 204. Alternatively, the transmitter TX2 can drive the link/channel 202 to a common-mode value, to avoid signal collision with the transmitter TX1. The transmitter TX1 of the master 204 performs the same operations when the master 204 enters the silent mode and the slave 206 enters the active mode according to the NOL schedule. The silent mode operation of a transmitter is similar to an electrical idle from signaling point of view.

When the master 204 enters the active mode and, correspondingly, the slave 206 is the silent mode, a training phase is initiated during which the master 204 uses its own local reference clock (master clock) for data transmission. In the silent mode, the slave 206 detects/recovers a clock signal from the received training signal, and computes the difference between the frequency of its own local reference clock (slave clock) and the frequency of the clock signal determined from the received training signal. The frequency of the recovered clock is the same as that of the master clock. The slave 206 then generates an offset corrected clock that is adjusted to match the frequency of the master clock. The offset corrected clock is called the adjusted reference clock. The slave 206 uses the adjusted reference clock for its own transmission when the slave 206 would enter the active mode.

During a transmission interval for an active device (master 204/slave 206), the receiver local to the active device (RX1/RX2) does not receive a signal from the far-end transmitter (TX2/TX1). In the absence of a valid far-end signal, the receiver's clock and data recovery circuitry (CDR1/CDR2) may lose phase and frequency lock to the far end signal when the far end device remains silent for an extended period of time (e.g., a few, tens or hundreds of milliseconds, a few seconds, etc.). This is due to the drift caused by leakage in clock recovery circuits and quantization error. During the silent mode, a device (slave 206/master 204) receives data transmitted by the far side device (master 204/slave 206), and the clock and data recovery (CDR) circuity of the silent mode device (slave 206:CDR2/master 204:CDR1) is locked to the data sent by the far side.

Specifically, when the slave device 206 is in the silent mode, the CDR2 circuitry receives via the local receiver RX2 the data (e.g., a training or a sync signal) transmitted by the far-side transmitter TX1, and recovers a clock signal that is synchronized to the clock of the transmitter TX1, e.g., the master clock. The recovered clock and the local reference clock of the slave 206 are compared by a comparison and adjustment circuitry 212 to derive the adjusted reference clock, which has the same frequency as that of the master clock.

When the slave 206 enters the active mode, its receiver RX2 does not receive a signal from the transmitter TX1 because the master 204 is in the silent mode and, as such, the CDR2 is locked to a lock assist pattern that is generated by its own lock assist pattern generator that uses as input the adjusted reference clock that was derived during the silent mode. As such, the CDR2 maintains a lock to the estimated clock of the far-side transmitter TX1 during the active mode, even though the slave 206 is not receiving any data from the master 204. The transmitter TX2 of the slave 206 uses an adjusted reference clock for data transmission, which has the same frequency as the master clock.

When the slave 206 subsequently enters the silent mode, its receiver RX2 begins to receive again a data signal, preceded by a training or a sync signal, from the far-side transmitter TX1 of the now active master 204. The clock used by the receiver RX2 is synchronized to the clock of the transmitter TX1, e.g., the master clock. Because the frequency of the adjusted reference clock, that was maintained by the CDR2 during the active mode, is the same as the frequency of the master clock, during the silent mode the CDR2 may only need to perform a phase adjustment, which can be accomplished in less time than would be necessary to synchronize both frequency and phase.

When the master device 204 is in the silent mode, the CDR1 circuitry receives via the local receiver RX1 the data (e.g., a training or a sync signal) transmitted by the far-side transmitter TX2, and recovers a clock signal that is synchronized to the clock of the transmitter TX2. The transmitter TX2 of the slave 206 uses the adjusted reference clock, which has the same frequency as the maser clock. As such, during the silent mode, the CDR1 may only need to perform a phase adjustment, which can be accomplished in less time than would be necessary to synchronize both frequency and phase.

For analog CDR implementations, the lock assist technique has at least two benefits: (a) it allows for a relatively faster re-lock to the far end transmitter when the local transmitter transitions to the silent mode, and (b) it can make the active/transmission and silent/reception periods independent of a receiver's ability to hold lock for an extended period during which the far end transmitter may not transmit. In the absence of a lock assist circuit, the frequency of an analog CDR would gradually lose its frequency synchronization with the far-side clock and drift back to its reference (local) clock.

In an alternate embodiment, for digital CDR implementations, during the active mode rather than using the lock assist pattern, the CDR circuitry of the device in the active mode disables its input, thus maintaining at least a frequency lock with the clock of the far-end transmitter. Once active mode ends, the CDR input is re-enabled to receive the signal transmitted by the far-end transmitter. A digital CDR will update its phase and frequency only when it sees a transition event. Suppressing the CDR input during active mode means that the only transitions the CDR sees will be those generated by the far-end transmitter. During active mode, the frequency may have drifted only by a minimal amount, e.g., due to quantization error, and, therefore, typically only the phase lock needs to be regained. Similar to the use of the lock assist pattern for analog CDRs, this minimizes the amount of time required for resynchronization because obtaining a phase lock generally requires less time than obtaining a frequency lock.

Figure 3:
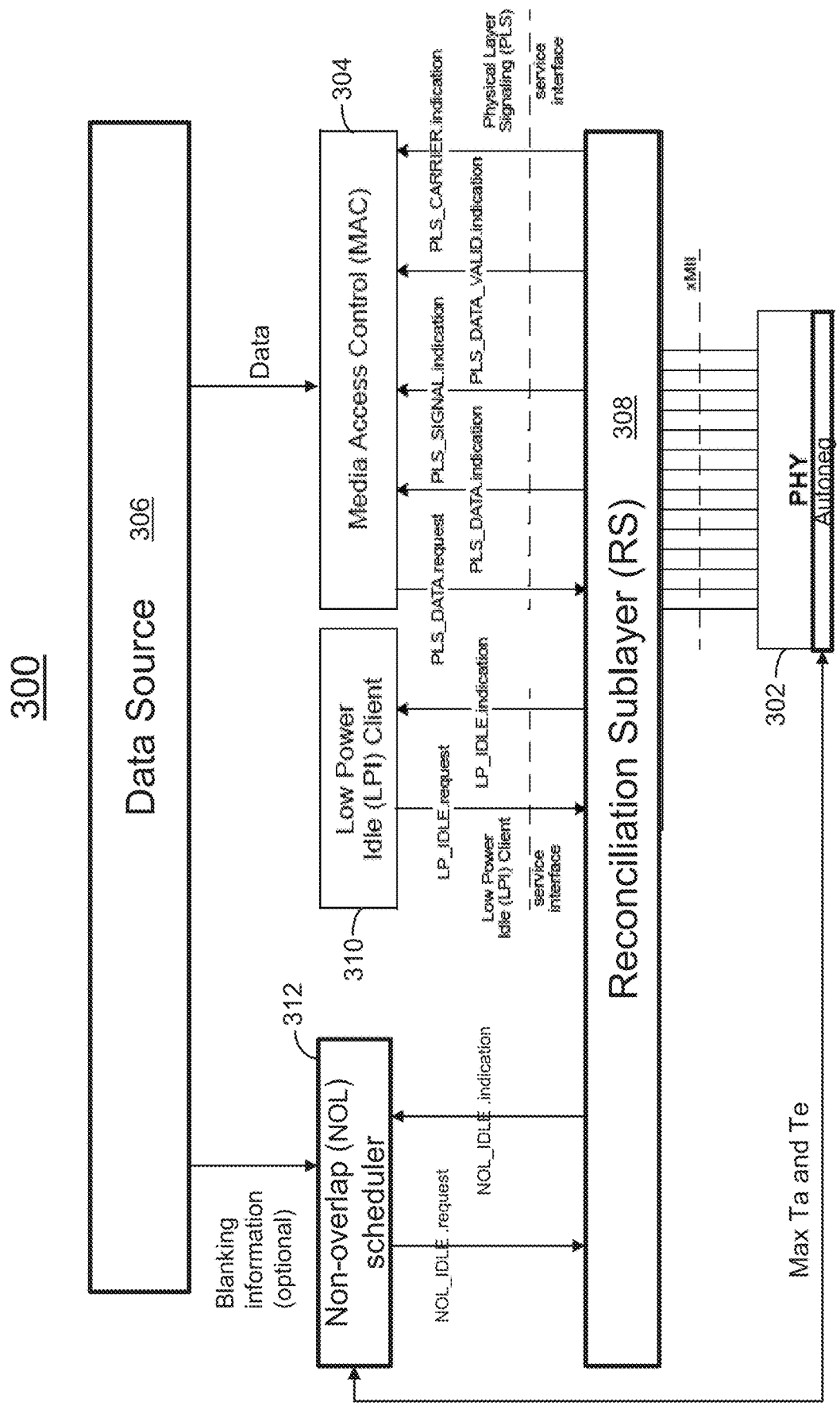
FIG. 3 schematically depicts the operations of the link-layer components a device communicating with another device per a non-overlapping (NOL) schedule, according to one embodiment.

With reference to FIG. 3, in an Ethernet-based communication system 300 according to one embodiment, when a source device or application (e.g., a video source, smart phone, tablet, etc.) intends to send data to a sink device or application (e.g., a video display, speaker, web browser, etc.), the topmost layer in the communication system (referred to as the Application layer in the Open Systems Interconnection (OSI) model) generates the data to be transmitted. This data is processed in several other layers (e.g., the six other layers of the OSI model). The lowest layer 302, e.g., the physical layer (referred to as PHY), represents electrically and physically connected (via a single wire or a wire pair) transmitters and receivers. One PHY is associated with the source device/application, and another PHY is associated with the sink device/application. In the discussion below, the application layers of the source and sink devices/applications are referred to as data source and data sink, respectively.

The PHY 302 exchanges data and control signals with the layer directly above, e.g., the data link layer, which includes the Media Access Control (MAC) 304 and Logical Link Control (LLC) sublayers. The LLC sublayer is not shown. The data source 306 sends data to the MAC 304 via several intervening layers. The MAC 304 communicates with and controls the operation of the associated local PHY 302 via the reconciliation sublayer (RS) 308. Sink devices/applications (not shown) also implement a similar hierarchy of layers where the PHY of the sink device/application can receive data from and, optionally, transmit data to the PHY of a remote (also called far side), connected source device/application. The MAC of the sink device/application communicates with and controls the operation of the associated PHY (e.g., the PHY of the sink device/application) via the RS of the sink device/application, and obtains the data received by the associated PHY. The MAC of the sink device/application then forwards the received data ultimately to the application layer of the sink device/application, e.g., to the data sink, where it may be rendered, e.g., displayed and/or stored. The MAC of the sink device/application can also obtain data from the application layer of the sink device/application, and can forward it to the associated RS, for transmission of the data via the associated PHY.

In order to control the associated PHY 302, the MAC 304 and the RS 308 exchange a number of signals. In particular, the MAC 304 send the "PLS_DATA.request" signal to inform the RS 308 that the MAC 304 intends to transmit data. Accordingly, the RS 308 configures the PHY 302 for transmission of data to a connected remote PHY, e.g., the PHY associated with the sink device/application. When the PHY 302 receives data from a connected remote PHY, the RS 308 sends a "PLS_DATA.indication" signal to the MAC 304, alerting the MAC 304 to receive data. In addition, the RS 308 may also send the "PLS_SIGNAL.indication," "PLS_DATA_VALID.indication," and/or "PLS_CARRIER.indication" signals to the MAC 304. The PLS_SIGNAL.indication signal informs the MAC 304 of the quality of or the errors associated with the signals received by the PHY 302. The PLS_DATA_VALID.indication signal informs the MAC 304 whether the data received, when so indicated by the PLS_DATA.indication signal, is valid. The PLS_CARRIER.indication signal informs the MAC 304 whether the associated PHY is receiving any signals from the remote PHY.

In the Energy-Efficient Ethernet (EEE) based systems, in addition to the MAC 304 the Low Power Idle (LPI) Client 310 also controls the PHY 302 via the RS 306. In particular, when the source device/application has no data to transmit, the LPI Client 310 sends an "LP_IDLE.request" signal with the parameter value "ASSERT" to the RS 308. In response, the RS 308 causes the associated PHY 302 to send a signal to the remote PHY, e.g., the PHY of the sink device/application, informing the remote PHY that the PHY 302 would enter the silent mode and would not transmit any data until it returns to the active mode. The PHY 302 is then placed in the silent mode, where the associated transmitter may be turned off. Conversely, if the PHY 302 is in the silent mode and the source device/application has data to transmit, the LPI Client 310 sends an LP_IDLE.request signal with the parameter value "DEASSERT" to the RS 308. In response, the RS 308 causes the PHY 302 to send a signal to the remote PHY, informing the remote PHY that the PHY 302 would enter the active mode and would transmit data, and the RS 308 causes the PHY 302 to return to the active mode.

The PHY 302 may receive signals from the remote PHY that inform the PHY 302 whether the remote PHY intends to enter the silent mode or the active mode. The RS 308 receives this information from the PHY 302, and provides that information to the LPI Client 310 using the signal "LP_IDLE.indication." Specifically, the signal LP_IDLE.indication with the parameter value ASSERT informs the LPI Client 310 that the remote PHY intends to enter the active mode to transmit data. The signal LP_IDLE.indication with the parameter value DEASSERT informs the LPI Client 310 that the remote PHY intends to enter the silent mode and would not transmit data until it returns to the active mode.

The system 300, includes an additional component, non-overlap (NOL) scheduler 312, that also communicates with the data source 306, and controls the PHY 302 via the RS 308. The non-overlap (NOL) schedule is discussed below with reference to FIG. 5. According to the NOL schedule, when two devices communicate with each other, the first and second devices alternate between the active and silent modes in a non-overlapping manner, e.g., when the first device is in the active mode, the second device is in the silent mode, and when the second device is in the active mode the first device is in the silent mode. Only the device in the active mode may transmit data and the device in the silent mode may receive data. For the sake of convenience, in the discussion below it is assumed that the system 300 is associated with the first device/application, so that the NOL scheduler 312 implements the active and silent modes of the first device/application. It should be understood that the system 300 (or another instance thereof) may be associated with the second device/application, where the NOL Scheduler in that system/instance would implement the active and silent modes of the second device/application.

The NOL schedule may be determined during auto-negotiation (performed according to the standard Ethernet protocols) between the PHY 302 and the remote PHY, e.g., the PHY associated with the second device/application. The NOL scheduler 312 determines the timing of NOL_IDLE signaling based on the parameters communicated thereto by the upper layers of communication system and the far side (also called remote side) information received during the auto-negotiation. If the data source 306 is configured to transmit video signals, the information received by the NOL scheduler 312 may include video blanking information, where the NOL scheduler 312 may use the blanking period of the video as one of the parameters in determining the timing of NOL_IDLE signaling.

Based on the NOL schedule, the NOL scheduler 312 causes the PHY 302 to switch between active and silent modes. In particular, in the system 300 when the first device is scheduled to be in the silent mode according to the NOL schedule, the NOL scheduler 312 sends a "NOL_IDLE.request" signal with the parameter value "ASSERT" to the RS 308. In response, the RS 308 causes the associated PHY 302 to send a "handover" signal to the remote PHY, e.g., the PHY of the second device/application, informing the remote PHY that the PHY 302 would enter the silent mode and would not transmit any data until it returns to the active mode. The PHY 302 is then placed in the silent mode, where the associated transmitter is turned off. The receiver associated with the PHY 302 is not turned off, however, and may receive data transmitted by the remote PHY, e.g., the PHY of the second device/application.

When the first device is scheduled to return to the active mode according to the NOL schedule, the NOL scheduler 312 sends an "NOL_IDLE.request" signal with the parameter value "DEASSERT" to the RS 308. In response, the RS 308 causes the transmitter associated with the PHY 302 to be turned on. The RS 308 also causes the PHY 302 to send a "sync" signal to the remote PHY, informing the remote PHY that the PHY 302 would return to the active mode and would transmit data. The PHY 302 is then placed in the active mode.

The PHY 302 may receive signals from the remote PHY that inform the PHY 302 whether the remote PHY intends to enter the silent mode or the active mode, also according to the NOL schedule, which is common to the two devices. The RS 308 receives this information from the PHY 302, and provides that information to the NOL scheduler 312 using the signal "NOL_IDLE.indication." Specifically, the signal NOL_IDLE.indication with the parameter value ASSERT informs the NOL scheduler 312 that the remote PHY is scheduled to enter the active mode and may transmit data. The signal NOL_IDLE.indication with the parameter value DEASSERT informs the NOL scheduler 312 that the remote PHY is scheduled to enter the silent mode and would not transmit data until it returns to the active mode.

Figure 4:
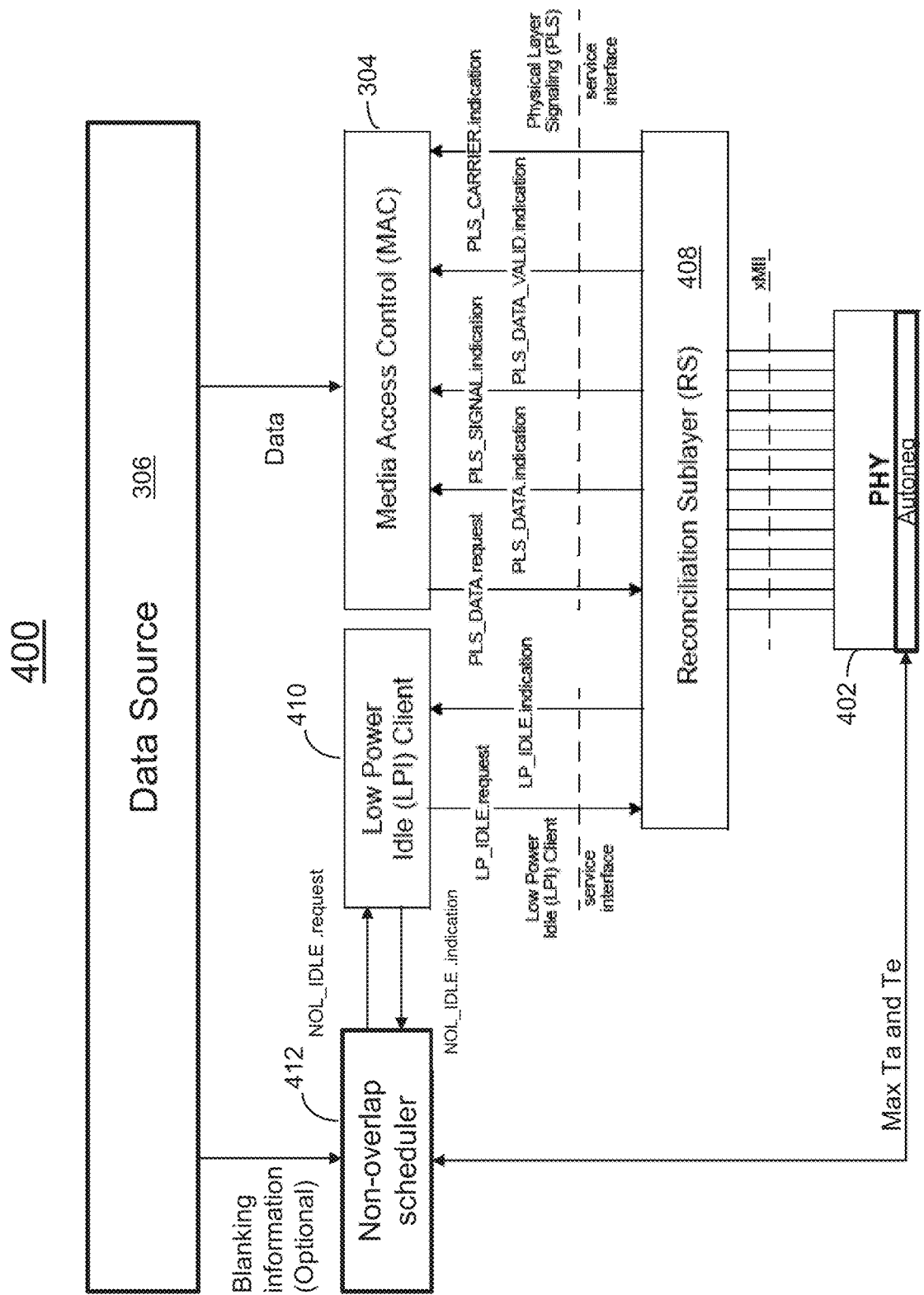
FIG. 4 schematically depicts the operations of the link-layer components a device communicating with another device per an NOL schedule, according to another embodiment.

With reference to FIG. 4, a communication system 400 according to another embodiment is similar to the system 300 (described above), except for in one aspect. In the system 400, the NOL scheduler 412 does not communicate with the RS 408 directly. Rather, the NOL scheduler 412 communicates with the LPI Client 410. In particular, when the first device is scheduled to be in the silent mode according to the NOL schedule, the NOL Scheduler 412 sends an "NOL_IDLE.request" signal with the parameter value "ASSERT" to the LPI Client 410. In response, the LPI Client 410 sends the LP_IDLE.request signal with the parameter value "ASSERT" to the RS 408, which causes the associated PHY 402 to enter the silent mode (as described with reference to FIG. 3). When the first device is scheduled to wake up and return to the active mode according to the NOL schedule, the NOL Scheduler 412 sends an "NOL_IDLE.request" signal with the parameter value "DEASSERT" to the LPI Client 410. In response, the LPI Client 410 sends the LP_IDLE.request signal with the parameter value "DEASSERT" to the RS 408, which causes the associated PHY 402 to enter the active mode (also described with reference to FIG. 3).

The PHY 402 may receive signals from a remote PHY informing the PHY 402 whether the remote PHY intends to enter the silent mode or the active mode according to the NOL schedule. The RS 408 receives this information from the PHY 402, and provides that information to the LPI Client 410 using the signal "LP_IDLE.indication." The LPI Client 410 forwards this information to the NOL Scheduler 412 using the signal "NOL_IDLE.indication." In particular, the signals LP_IDLE.indication and NOL_IDLE.indication with the parameter value ASSERT inform the LPT Client 410 and the NOL Scheduler 412, respectively, that the remote PHY is scheduled to enter the active mode and may transmit data. The signals LP_IDLE.indication and NOL_IDLE.indication with the parameter value DEASSERT inform the LPI_Client 410 and the NOL Scheduler 412, respectively, that the remote PHY is scheduled to enter the silent mode and would not transmit data until it returns to the active mode.

Figure 5:
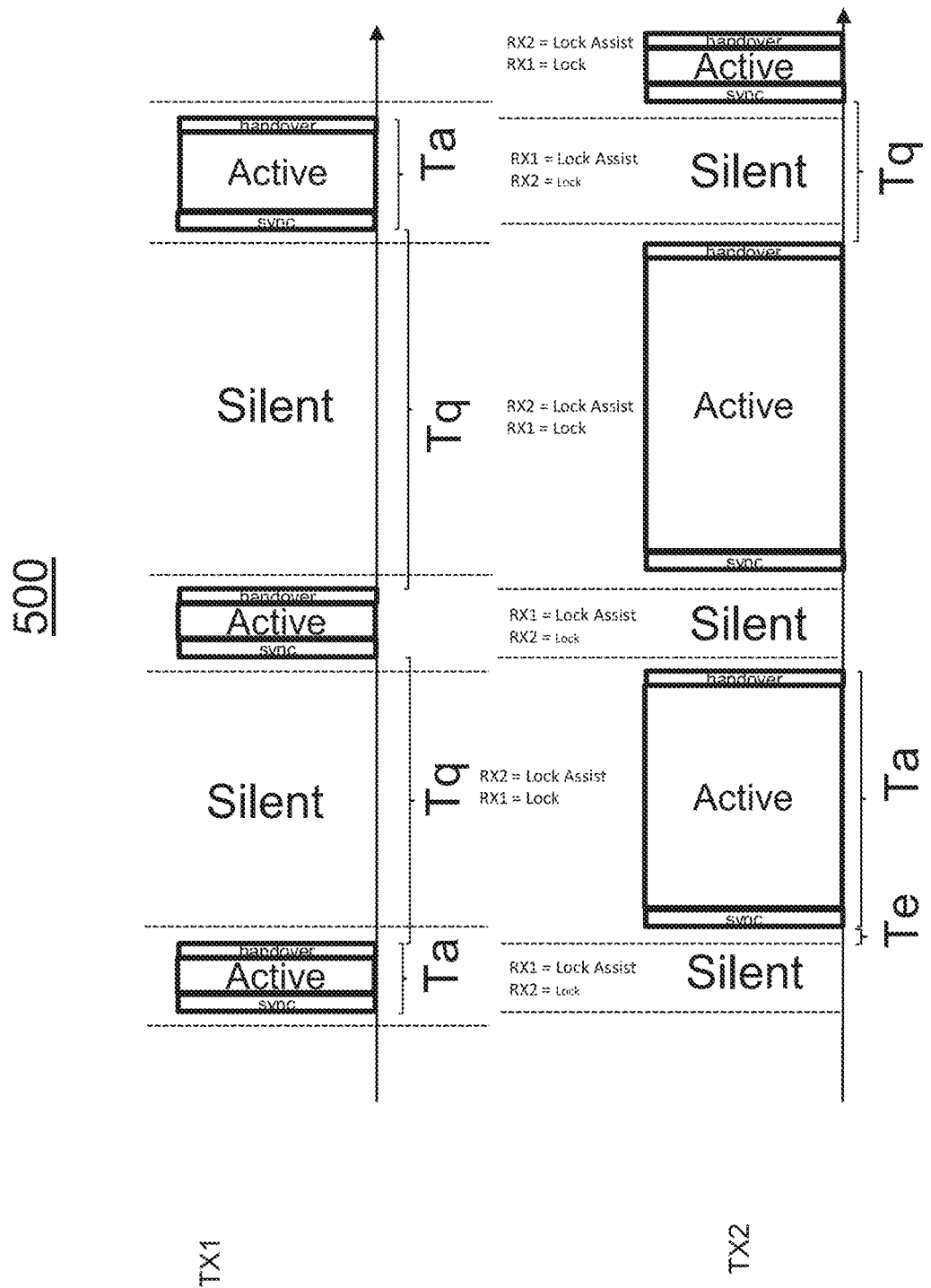
FIG. 5 is an example timing diagram of a pair of devices communicating per an NOL schedule, according to one embodiment.

The operations of two devices communicating bi-directionally using a non-overlapping (NOL) schedule can be understood with reference to FIG. 5. In an example timing diagram 500, the NOL scheduler uses the following parameters corresponding to a link and a communication session.

TABLE 1

NOL Scheduler Parameters

| Parameter | Computed As | Represents |
|---|---|---|
| Te | 2 x max_prop_delay + implementation_margin | A timing gap corresponding to: (i) the maximum propagation delay across the link established between two devices, and (ii) a |

TABLE 1-continued

NOL Scheduler Parameters

| Parameter | Computed As | Represents |
| --- | --- | --- |
| Ta | sync + Active data + handover | protective buffer delay, to ensure non-overlapping transmissions by the two devices. Sync is the duration of the sync signal that a local device transmits in the active mode. The far-side device in the silent mode receives the sync signal and performs clock recovery/synchronization; Active data is the duration of the data transmission, which can include data and/or control messages, by a device in the active mode. This duration can be fixed for a session, or may be adjusted dynamically during a session to the extent of max Ta. Handover is the duration of the handover signal using which a local device indicates to the far-side device that the local device would transition from the active mode to the silent mode |
| Tq | | Duration for which a device remains in the silent mode. This duration is implicitly defined by the active period Ta of the partner device. |
| Tq_max_tol | | Maximum silent duration that a device may tolerate, e.g., without losing synchronization even when using the lock assist technique (described with reference to FIG. 2) or due to system level buffering constraints. |
| max Ta | Tq_max_tol − 2xTe | max Ta indicates the longest time a device may remain in the active mode without violating the Tq_max_tol of the far-side device. |

An additional parameter, Min_Tq, may be communicated to the far side PHY device optionally, for the far side PHY device to configure its handover duration and circuitry.

For the bi-directional exchange of data, one device (generally referred to as the master device or the master) is scheduled to enter the active mode first, where the master transmits data. At this time, the other device (generally referred to as the slave device or the slave) is scheduled to remain in the silent mode, where it receives data from the master. After the master stops its transmission, it enters the silent mode and the slave enters the active mode, where the slave can transmit data, which is received by the master. This alternating pattern of transmissions can continue for each communication session, as shown in the timing diagram 500.

Specifically, upon entering the active mode, the master transmitter transmits the sync signal, followed by the data signal (denoted "Active"), followed by the handover signal. The total duration (Ta) of these signals is selected to not exceed Tq_max_tol. Thereafter, the master waits for the duration (at least equal to Te) and then enters the silent mode. While the master is in the active mode, the master receiver remains in the lock-assist state (described with reference to FIG. 2). Also while the master is in the active mode, the slave remains in the silent mode, and the slave receiver remains in the lock state, maintaining a lock with the clock of the master transmitter, which is received from the sync and/or data transmitted by the master transmitter.

After the handover signal from the master terminates, the slave waits at least for the duration Te, and then transitions to the active mode. Now the slave transmitter sends the sync, data, and handover signals without exceeding the Tq_max_tol constraints. While the slave is in the active mode, the slave receiver operates in the lock-assist state. Also while the slave is in the active mode, the master remains in the silent mode and the master receiver remains in the lock state, maintaining a lock with the clock of the slave transmitter. Before returning to the active mode again, the master waits at least for the duration Te.

Te may be determined via Time Domain Reflectometry (TDR) before starting auto-negotiation (described with reference to FIG. 6). Level of asymmetry can be achieved and controlled by the devices by limiting their respective Ta, where the duration of data transmission for one device can be different from the duration of data transmission of the other device. The link partner devices may also adjust the duty cycle of the transmission and silent modes, e.g., the durations Ta and Tq on the fly, e.g., between two sessions. Such adjustment of duty cycle can be 50% allowing for a symmetrical bandwidth in both directions.

In various embodiments described above, overlapping transmission by both devices is not permitted, e.g., after sending a handover signal the currently active device ceases transmission. In communication systems, noise can cause the data to be corrupted such that it cannot be received correctly by the far side. To make the system robust to noise, after a device sends the handover signal, if the receiver of that PHY device does not receive the sync signal for a pre-determined time, the device may wait for a time period equal to Tq_max_tol of the far-side device before sending its own sync signal again, entering the next active mode of that device. If the sync signal is not received repeatedly for a pre-determined number of times, the PHY device may drop the link and may enter the auto-negotiation phase again. Some embodiments use counter based timing circuitry to track the active and silent time slots and/or to perform transitions therebetween. Absolute time systems such as IEEE 1588 systems are not required but can be used to commence and terminate the active and silent modes and the corresponding timing windows.

In some embodiments, the sync signal is used by the receiver of the device in the silent mode to re-acquire lock to the transmitter of the far-end device that is in the active mode. During lock-acquisition, some bits may be received by the local receiver with errors. Such errors do not cause errors in MAC-to-MAC data exchange, however, because the sync signal does not contain actual data or control signals. The handover signal is sent to the far-side device to indicate to that device that it may prepare to enter the active mode and may prepare for transmission. In some embodiments, the active periods can end without handover signal and/or start without the sync signal. In some embodiments, the silent timing period Tq is selected according to the conventional PHY EEE timing parameters, so that the custom clock and data recovery circuitry (described with reference to FIG. 2) is not needed and, instead, the conventional circuitry designed for EEE timing parameters may be used.

Figure 6:
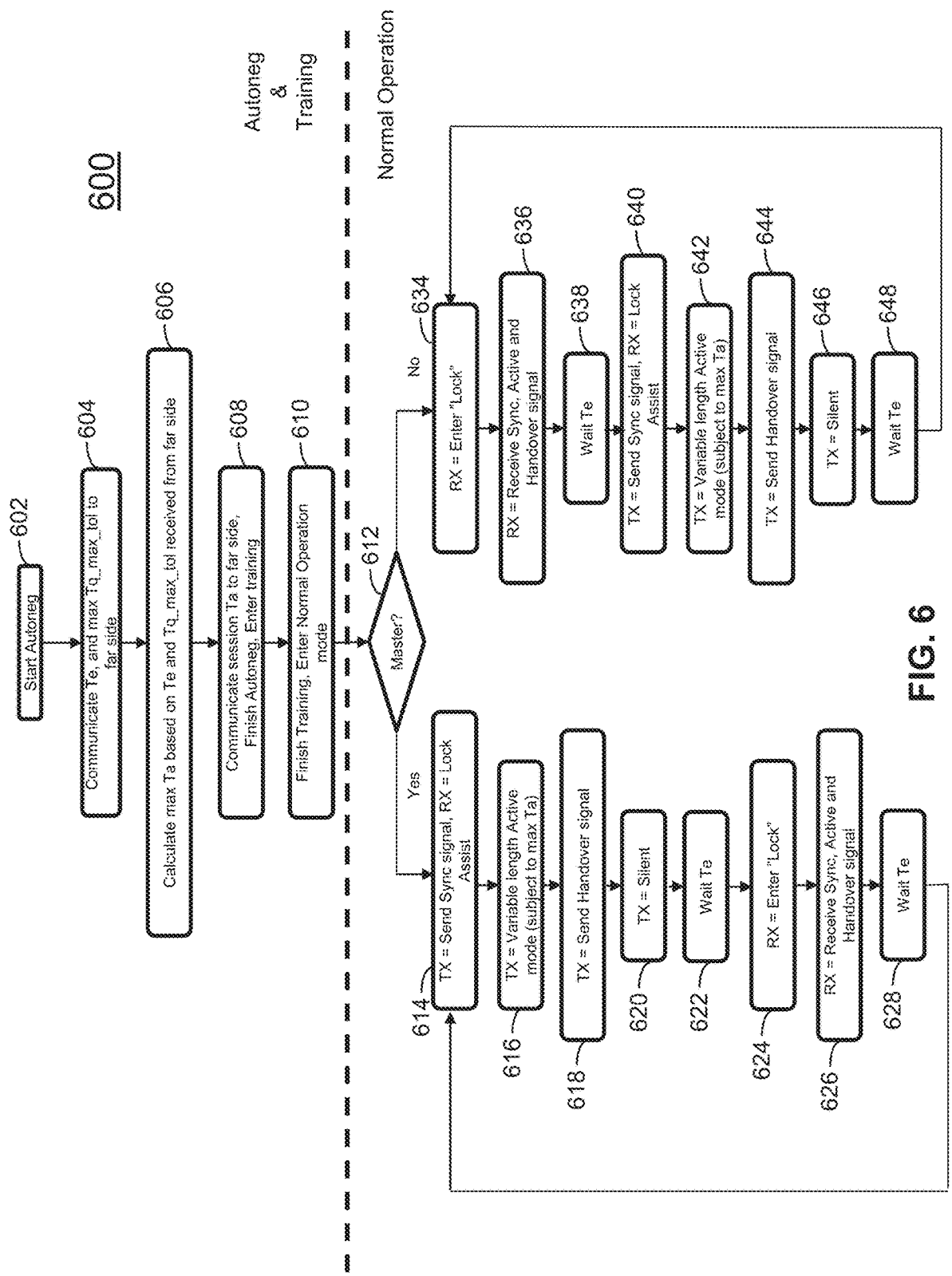
FIG. 6 depicts an example process of communication between two devices per an NOL schedule, according to one embodiment.

With reference to FIG. 6, in a process 600 that facilitates bi-directional communication between two devices according to one embodiment, certain operations are performed in the auto-negotiation and training phase, to setup the communication protocol and a non-overlapping schedule. In particular, auto-negotiation is initiated at step 602. During auto-negotiation one device is designated the master status (or the first-to-transmit device status) and the other device is designated the slave status (or the second-to-transmit device status). At step 604, either or both devices communicate to the respective far-side device the communicating device's parameter Te, e.g., the sum of the maximum round trip propagation delay across the communication link and an implementation margin. Either or both devices also transmit to the respective far-side device the respective parameter Tq_max_tol, e.g., the maximum silent time the receiver of the transmitting device may tolerate, at step 604. At step 606, each device computes the parameter max Ta, e.g., the maximum duration for which that device may remain in the active mode, using the parameters Te and Tq_max_tol received from the respective far-side device.

Either or both devices communicate to the respective far-side device parameter Ta, e.g., the sum of the handover duration, the duration for which the communicating device may transmit data (such may include data and/or control messages), and the sync duration, at step 608. The training phase also begins at step 608, where the slave determines the adjusted reference clock, as described with reference to FIG. 2. The training is completed at step 610, and the parameter max Ta is determined using the parameters exchanged, at step 610. The process then enters the normal operation phase.

In the normal operation phase, at step 612 each device determines whether it is designated the master (or the first-to-transmit) status. At step 614, the master device (also referred to as the master) enters the active mode, and the master transmitter transmits a sync signal, which the slave device (also referred to as the slave) can use to perform clock synchronization, as described with reference to FIG. 2. Additionally, at step 614 the master receiver uses the lock-assist technique (also described with reference to FIG. 2) to maintain an approximate synchronization with the slave transmitter, i.e. to maintain a lock with an estimated clock of the slave transmitter. At step 616, the master transmitter sends data to the slave, where the duration of data transmission can be fixed or variable, without exceeding the parameter max Ta computed in step 606.

At step 618 the master transmitter transmits the handover signal informing the slave that the master is about to enter the silent mode. Thereafter, the master enters the silent mode at step 620, and waits for the duration specified by the parameter Te of the slave (received in step 606), at step 622. At step 624, the master receiver enters the lock state in which the master receiver can synchronize its clock to the clock of the slave transmitter.

At step 626, the master receiver receives the sync signal, which the master receiver uses to synchronize its clock with that of the slave transmitter, as described with reference to FIG. 2. Also at step 626, the master receiver receives data transmitted by the slave and, subsequently, the handover signal, when the slave has completed its data transmission and is about to enter the silent mode. The received handover signal informs that master that it may enter the active mode. At step 628, the master waits again for the duration Te, and thereafter the process repeats from step 614, where the master is in the active mode again, and can transmit additional data to the slave device.

When the master performs step 614, the slave performs step 634, where the slave receiver enters the lock mode, so that the slave receiver can synchronize its clock with that of the master transmitter. At step 636, the slave receiver receives the sync signal, which the slave receiver uses to synchronize its clock with that of the master transmitter, as described with reference to FIG. 2. Also at step 636, the slave receiver receives data transmitted by the master and, subsequently, the handover signal, when the master has completed its data transmission and is about to enter the silent mode. The received handover signal informs the slave that it may enter the active mode.

At step 638, the slave waits again for the duration specified by the parameter Te received from the master in step 604. After the wait, at step 640, the slave enters the active mode, and the slave transmitter transmits a sync signal, which the master can use to perform clock synchronization, as described with reference to FIG. 2. In addition, at step 640 the slave receiver uses the lock-assist technique (also described with reference to FIG. 2) to maintain an approximate synchronization with the master transmitter, e.g., to maintain a lock with an estimated clock of the master transmitter. At step 642, the slave transmitter sends data to the master, where the duration of data transmission can be fixed or variable, without exceeding the parameter max Ta computed in step 606.

At step 644 the slave transmitter transmits the handover signal informing the master that the slave is about to enter the silent mode. Thereafter, the slave enters the silent mode at step 646, and waits for the duration specified by the parameter Te of the master (received in step 606), at step 648. After the wait, the process repeats from the step 634, where the master is in the active mode and the slave returns to the silent mode and can receive additional data transmitted by the master.

Various embodiments described herein allow the parameter Ta, which determines the duration of data transmission by the device in the active mode, to be variable and adjustable from session-to-session or intra session. In some embodiments, however, the devices can choose to have fixed Ta, e.g., to avoid latency jitter. In such cases, the system implementation benefits by having the MAC layer have a constant bit rate interface, rather than an interface that can start and stop data transmission and reception at arbitrary times. For example, a conventional MAC that does not incorporate an LPI client or NOL scheduler (described with reference to FIGS. 3 and 4) may not be able to start and stop data transmission locally, as required by the NOL schedule. Such a system can deploy bi-directional communication over single-pair/wire by incorporating transitions between the active and silent modes within the PHY layer. In such an embodiment, the NOL scheduler is incorporated within the PHY layer via constant-bit rate (CBR) interface circuitry, as described below.

Figure 7:
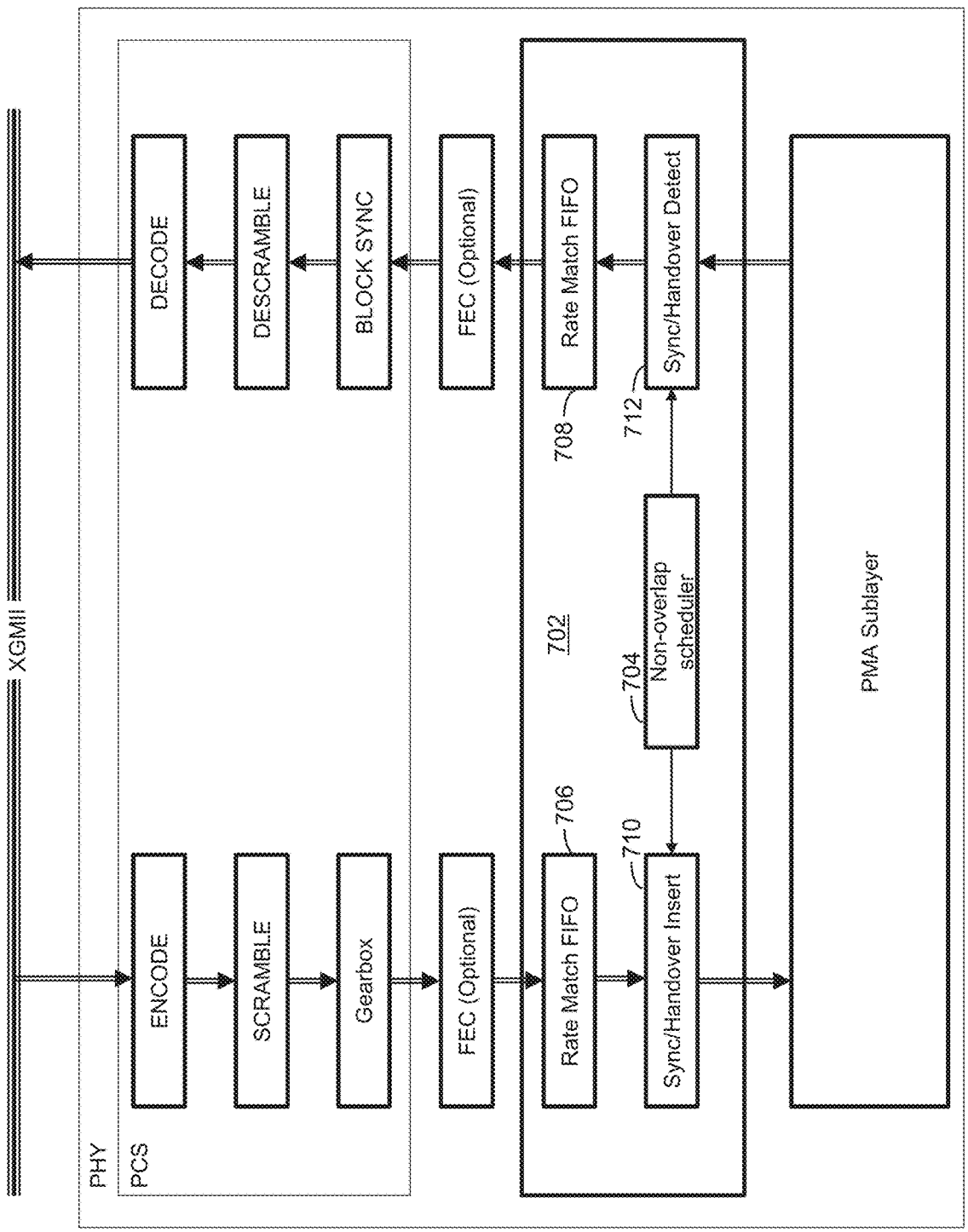
FIG. 7 schematically depicts the operations at the physical layer of a device communicating with another device per an NOL schedule, according to one embodiment.

With reference to FIG. 7, in the communication system 700, the physical layer (PHY) includes the physical coding sublayer (PCS) used in a conventional Ethernet-based system. The PCS sublayer includes the conventional components such as "encode," "decode," "scramble," "descramble," "gearbox," and "block sync." These components perform various steps to convert data from a form independent of physical media type to one specific to a particular media. The "encode" block converts 8 bytes of control or data characters into a 66-bit block, known as 64/66 encoding. The "scramble" step applies a well-known scrambler polynomial to randomize the bit stream to improve the performance of the receiver CDR, and the "gearbox" step breaks the 66-bit encoded words into the data size required by the serializer. In the receive path, the "block sync" component looks for particular patterns to detect the 66-bit word boundaries, the "descramble" step uses the scrambler polynomial to unscramble the data, and the "decode" block converts 66-bit words back into 8 bytes of control/data characters.

In addition, the PHY includes CBR interface circuitry 702 that communicates with the physical medium attachment (PMA) sublayer for transmission of signals over and reception of signals from the medium or link, e.g., a single wire or a single wire pair. The CBR interface circuitry includes an NOL scheduler 704 and two rate-matching first-in-first-out (FIFO) buffers 706, 708. The CBR interface circuitry 702 also includes a component 710 to insert handover and sync signals into the data stream to be transmitted and a component 712 to detect handover and sync signals from the received data stream. During the auto-negotiation phase, after the NOL schedule is determined, the PHY establishes a ratio between the forward and reverse directions, e.g., between the active and silent durations, which then remains fixed for a particular session. This ratio establishes a continuous bit rate at the MAC layer for both the transmit (TX) and receive (RX) directions, each of which is the instantaneous PHY bit rate multiplied by the ratio of the active portion to the total period time Ta+Tq+2*Te.

In general, the sum of the TX and RX constant bit rates is less than the instantaneous bit rate due to the effects of the Te, handover, and sync periods.

The size of the rate matching FIFOs 704, 706 is based on the instantaneous bit rate the PHY can support multiplied by the largest active period value it can support, which is the most number of bits the PHY will need to buffer while the PHY is in the silent mode. In the TX direction, bits are enqueued into the Rate Match FIFO 704 at the TX constant bit rate, and during the active phase, the data bits are dequeued at the instantaneous bit rate. In the RX direction, received data bits are enqueued at the instantaneous bit rate while the receiver is receiving data from the far-side deice (e.g., the local device is in the silent mode), and dequeued at the RX constant bit rate.

During this operation, the rate match FIFOs 704, 706 typically oscillate between near-empty and near-full as the PHY goes through the active and silent phases, but will not overflow or underflow as the active and silent period ratios are fixed. This technique can reduce the overall latency and latency variation of the communication system because the handover is done not at packet/frame boundary but at symbol boundary. In some embodiments, forward error correction (FEC) circuitry is included in the PHY, and the Rate matching FIFOs 704, 706 can be implemented at the FEC frame level.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method, comprising:
configuring a first device to enter an active mode according to a non-overlapping (NOL) schedule with a second device, the second device being in a silent mode concurrently while the first device is in the active mode;
maintaining, by a receiver of the first device, lock with an estimated transmission clock of the second device while the first device is in the active mode;
transmitting by a transmitter of the first device, a first data signal for a duration less than or equal to a maximum silent duration associated with the second device; and
configuring the first device to enter the silent mode after transmitting the first data signal to the second device, according to the NOL schedule.

2. The method of claim 1, wherein the first data signal comprises:
a data message or a control message; and
at least one of a sync signal or a handover signal, the sync signal preceding the data message or the control message and the handover signal following the transmission of the data message or the control message.

3. The method of claim 1, wherein an input of a clock and data recovery (CDR) module of the receiver of the first device is disabled while the first device is in the active mode.

4. The method of claim 1, further comprising:
recovering by the receiver of the first device, a transmission clock of the second device; and
receiving a second data signal transmitted by the second device while the first device is in the silent mode.

5. The method of claim 4, further comprising:
generating by the receiver of the first device an adjusted reference clock having a frequency equal to a frequency of the transmission clock of the second device.

6. The method of claim 5, further comprising:
configuring the first device to re-enter the active mode in accordance with the NOL schedule; and
maintaining by the receiver of the first device, lock to the adjusted reference clock while the second device is in the silent mode.

7. The method of claim 1, further comprising:
configuring the first device to re-enter the active mode in accordance with the NOL schedule;
maintaining, by the first device, lock with an estimated transmission clock of the second device while the first device is in the active mode; and transmitting by the transmitter of the first device, third data signal for a duration less than or equal to the maximum silent duration associated with the second device.

8. The method of claim 1, wherein the active mode and the silent mode of the first device are configured using a non-overlapping (NOL) scheduler that enforces the NOL schedule, the NOL scheduler being implemented at a link layer or a physical layer.

9. The method of claim 8, wherein the NOL scheduler:
is implemented at the link layer; and
is configured to communicate with a low power idle (LPI) client of the first device.

10. The method of claim 8, wherein:
the NOL scheduler is implemented at the physical layer, the method further comprising:
exchanging data between first-in-first-out buffers of the physical layer and a link layer at a substantially constant bit rate.

11. The method of claim 1, further comprising:
generating the NOL schedule using a plurality of device parameters associated with each of the first and second devices.

12. A first device, comprising:
a scheduler configured to switch the first device between an active mode and a silent mode according to a non-overlapping (NOL) schedule with a second device;
a transmitter configured to transmit a first data signal for a duration less than or equal to a maximum silent duration associated with the second device while the first device is in the active mode; and
a receiver configured to receive a second data signal from the second device while the first device is in the silent mode and configured to maintain lock with an estimated transmission clock of the second device while the first device is in the active mode.

13. The first device of claim 12, wherein:
the first data signal comprises a data message or a control message, and at least one of a sync signal or a handover signal; and
the transmitter being further configured to transmit the sync signal preceding the data message or the control message, and to transmit the handover signal following the data message or the control message.

14. The first device of claim 12, wherein:
the receiver comprises a clock and data recovery (CDR) module and a selector configured to:
select an input of the CDR module; and
disable the input of the CDR module while the first device is in the active mode.

15. The first device of claim 12, wherein receiver is configured to recover a transmission clock of the second device while in the silent mode.

16. The first device of claim 15, wherein the receiver is further configured to:
generate an adjusted reference clock having a frequency equal to a frequency of the transmission clock of the second device while the first device is in the silent mode.

17. The device of claim 16, wherein:
the scheduler is configured to enter the first device into the active mode from the silent mode; and
the receiver is configured to maintain lock to the adjusted reference clock while the first device is in the active mode.

18. The device of claim 12, wherein:
the scheduler is configured to enter the first device into the active mode from the silent mode; and
the transmitter is configured to transmit a third data signal for a duration less than or equal to the maximum silent duration of the second device.

19. The device of claim 12, wherein the scheduler is implemented at a link layer or a physical layer.

20. The device of claim 19, wherein:
the scheduler is implemented at the link layer;
the first device further comprises a low power idle (LPI) client; and
the scheduler is configured to communicate with the LPI client.

21. The device of claim 19, wherein:
the scheduler is implemented at the physical layer; and
the first device further comprises first-in-first-out buffers configured to exchange data with the link layer at a substantially constant bit rate.

22. The device of claim 12, wherein:
the NOL schedule is based on at least one of one or more parameters of the first device, or one or more parameters of the second device.

23. A system, comprising:
a first device; and
a second device in communication with the first device via a single wire or a single wire pair, wherein:
the first device is configured to:
switch between an active mode and a silent mode according to a non-overlapping (NOL) schedule,
transmit a first data signal and maintain lock with an estimated transmission clock of the second device while in the active mode,
receive a second data signal while in the silent mode;
and the second device is configured to:
switch to the silent mode when the first device is in the active mode, and
switch to the active mode when the first device is in the silent mode.

* * * * *

UNITED STATES PATENT AND TRADEMARK OFFICE
CERTIFICATE OF CORRECTION

PATENT NO. : 11,038,607 B2
APPLICATION NO. : 16/447714
DATED : June 15, 2021
INVENTOR(S) : Kamal Dalmia Page 1 of 1

It is certified that error appears in the above-identified patent and that said Letters Patent is hereby corrected as shown below:

In the Claims

In Column 16, Line 31, in Claim 1, delete "transmitting" and insert -- transmitting, --

In Column 16, Line 48, in Claim 4, delete "recovering" and insert -- recovering, --

In Column 16, Line 53, in Claim 5, delete "generating by the receiver of the first device" and insert -- generating, by the receiver of the first device, --

In Column 16, Line 59, in Claim 6, delete "maintaining" and insert -- maintaining, --

In Column 17, Line 1, in Claim 7, delete "transmitting by the transmitter of the first device, third" and insert -- transmitting, by the transmitter of the first device, a third --

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*